3,266,925
OIL-STAIN RESISTANT ROOFING AND SIDING SHEETS

Donald E. Lovness, Stillwater, Minn., assignor to Minnesota Mining & Manufacturing Company, St. Paul, Minn., a corporation of Delaware
No Drawing. Filed Oct. 1, 1962, Ser. No. 227,571
3 Claims. (Cl. 117—27)

The present invention relates to the prevention of oil-staining or discoloration of the granular surfacing of plastic strata, such as bituminous roofing material, occasioned by adsorption over the granule surfaces of migratory light-weight oil fractions present in the strata. In one aspect the invention pertains to oil-stain resistant granular materials, such as, for example, artificially colored roofing granules, and to the plastic strata employing such granular materials as surfacing.

Roofing granules, both natural and artificially color-coated granules, find extremely wide use in roofing and siding materials. One important such use is in bituminous roll roofing and asphalt shingles. The granules form a coating partially embedded in one surface of asphalt-impregnated and asphalt-coated fibrous sheet material to provide an adherent weather-resistant and decorative exterior surface.

The asphalt or bituminous composition invariably contains amounts of light-weight oil fractions. The migration of these oil fractions is particularly prevalent in bituminous roofing and siding compositions during the period, often several weeks or months, after manufacture, but prior to final installation out-of-doors. It is during this period that oil-staining of the granule surfacing is most prevalent. The light-weight oil fractions slowly but incessantly migrate over and are adsorbed by the protruding granule surface, thus imparting a stained or discolored appearance to the granules. The problem of oil-staining is particularly acute in the case of light-colored and bright-colored granules, although it is by no means confined thereto. Darker colored granules are also adversely affected by oil-staining.

The discoloration due to oil-staining occurs whether the granules are used in their natural state or whether they are artificially colored. The problem is most important, however, in the latter case due both to the comparatively larger volume used and to the delicate shades of color available in artificially colored granules which are affected to a greater degree.

A method has been developed by which the aforementioned difficulties with oil-staining or discoloration of the granule surfacing in plastic strata are obviated, but the capacity of the granules to form an adherent bond with the roofing surface may be impaired. This method includes the pre-treatment of the granules with a relatively small quantity of stable oleophobic fluorocarbon sizing agent applied to the surface of the granules as a suitably dilute solution or dispersion in a volatile liquid vehicle so that, upon drying, the granule surfaces are rendered stably oleophobic. The treated granules are thus rendered repellent to the light-fraction oils of the asphalt to which they are subsequently applied. Oil-staining does not occur. The treatment is stable; that is, it is highly adherent and/or inter-reacted with the granule surface whereby the oil-resistant characteristics of the treated granules are long-lasting.

It is an object of this invention to improve the adhering properties of the fluorocarbon-treated granules in such compositions.

Another object is to prevent oil-staining of bitumen roofing and siding materials.

Other objects and advantages will become apparent to those skilled in the art from the accompanying description and disclosure.

In accordance with this invention, a cationic salt of a quaternary hydrocarbon amine is mixed with the plastic strata, such as bitumen, in an amount between 0.5 and about 10 weight percent, based on the plastic strata. The inclusion of the cationic salt of the amine in the plastic strata results in improved adherence of the fluorocarbon-treated mineral granules to the plastic strata. The treated mineral granules are coated on a molten plastic strata containing the cationic amine salt. The cationic amine salt apparently reacts with the anionic fluorocarbon surfactant or sizing agent on the treated mineral granule at the interface, whereby the fluorocarbon looses its surfactant properties at the interface. The anionic fluorocarbon sizing agent remains on the outer or exposed surface of the granule protecting the granule surface from stain.

The cationic amine salt should have a hydrocarbon "tail" of at least 8 carbon atoms and preferably not more than about 24 carbon atoms. Both mono and polyamine salts are within the scope of the invention. The chlorine, bromine and acetate derivatives of quaternary amines are preferred. Examples of suitable cationic quaternary amines include N-chloro, octadecyl, dimethyl-2-methyl N'-chloro, trimethyl ethylene diamine; N-bromo, trimethyl N'-bromo, octyl, dimethyl, hexamethylene diamine; N-acetoxy, triethyl-N'-acetoxy, 2-ethylhexyl, diethyl-ethylene diamine; N-chloro, trimethyl-N'-chloro, dimethyl, dodecyl-trimethylene diamine and N-chloro, decyl, tri-n-butyl amine.

The oleophobic fluorocarbon sizing agents as a class used to pretreat the granules are carbon compounds which are chemically characterized by having in the molecule one or more highly fluorinated or perfluorinated terminal chains or side chains serving as fluorocarbon tails. The tails are both oleophobic and hydrophobic, in contrast to a corresponding hydrocarbon chain which is oleophilic. The molecule also includes one or more hydrophilic anionic polar groups which serve to bond the molecule to hydrophilic surfaces when the compound is coated on such a surface. A polymeric molecule will include a large number of fluorocarbon tails. Oleophobic fluorocarbon sizing agents are presently available commercially from the Minnesota Mining & Manufacturing Company of St. Paul, Minnesota.

The anionic fluorocarbon sizing compound is applied to the granules as a dilute solution or dispersion preferably in water although some or all of the water may be replaced by a volatile organic solvent or dispersant. Upon drying, a minute coating is provided upon the hydrophilic substrate surface. In most instances the resultant dried coating is invisible on the granule surface, even upon microscopic examination. In fact, indications are that the layer is substantially of monomolecular thickness. The coating is physically bonded to the granule substrate in contact therewith and with the fluorocarbon tails held to the substrate. Thus, the outer surface of the coating has a fluorocarbon-like characteristic that renders it oleophobic.

Preferred oleophobic fluorocarbon sizing agents are the ammonium and alkali metal salts of fluorocarbon monobasic acids. Preferred fluorocarbon monobasic acids are the fluoroalkanesulfonamido alkylenemonocarboxylic acids, e.g. N-methyl, N-perfluorooctanesulfonyl glycine, the fluoroalkanoic acids, e.g. perfluorooctanoic acid, and the fluoroalkanesulfonic acids, such as perfluorooctanesulfonic acid, which have a fluorocarbon tail at one end of the molecule and a functional polar carboxylate "head" group at the other end of the molecule. In the case of the perfluoroalkanesulfamido alkylene monocarboxylic acids, the groups are linked together by an interposed sulfonamidoalkylene "body" group. Preferably, the fluorocarbon tail group in these acids consists of 5 to 10 fluorinated carbon atoms.

The fluoroalkanesulfonamidoalkylenemonocarboxylic acids and their preparation are described in the United States patent of Harvey A. Brown, U.S. No. 2,809,990, issued October 15, 1957.

The highly suitable fluorocarbon monocarboxylic acids are the partially or completely fluorine-substituted counterparts of aliphatic carboxylic acids which have a functional polar carboxylate head group at one end of the molecule and a fluorocarbon tail connected thereto at the other end of the molecule. Fluorocarbon acids of this latter type and their preparation are described in Diesslin et al. U.S. Patent No. 2,567,011, issued September 4, 1951, and Diesslin et al. U.S. Patent No. 2,593,737, issued April 22, 1952.

The fluoroalkanesulfonic acids useful in the present invention are described in Brice et al. U.S. Patent No. 2,732,398, issued January 24, 1956.

These acid salts are employed in amounts from 5 to 1000 parts per million (weight) based on the particle to be coated.

Having now generally described my invention, the following non-limitative example of certain preferred embodiments will more specifically illustrate the same. Unless otherwise indicated, amounts are listed in parts by weight.

EXAMPLE

A solution of the potassium salt of N-methyl, N-perfluorooctanesulfonyl glycine,

prepared according to the procedures set out in the aforementioned Brown Patent No. 2,809,990, was prepared by adding 13.6 parts by weight of the acid to about 75 parts by weight of a vehicle consisting of 80 percent by weight of water and 20 percent isopropyl alcohol. The acid was just neutralized with a potassium hydroxide solution, during which time solution was effected. Additional water-isopropyl alcohol vehicle was then added to bring the total weight of solution to 100 parts and to reduce thereby the concentration to 14 percent solids.

White artificial roofing granules were prepared by completely and uniformly coating 2000 pounds of crushed and graded (−10+35 mesh) argillite granules with a suspension of 55 pounds of titanium dioxide pigment, 32 pounds of kaolin clay in a binder solution of 70 pounds of "K" brand aqueous sodium silicate (11% $Na_2O$:31.2% $SiO_2$) and 30 pounds of water; pre-drying the coated granules in the mixer by passing a stream of air therethrough; and further drying and firing the coated granules in a rotary direct-fired kiln at a temperature of 950° F. The hot coated granules were then transferred to a rotary cooler through which an airstream was passing where they were first partially cooled by sprays of water.

The oleophobic fluorocarbon sizing agent solution, prepared as above-described, and diluted with water just prior to application to a solids content of about 0.2%, was then sprayed on the still hot granules at a rate such that 0.08 pound of the sizing agent was applied per ton of the original uncoated granules. The residual heat from the granules quickly caused the liquid vehicle to flash off or evaporate, leaving a dried extremely thin treatment of the sizing agent on the granule surfaces.

Following this, a light-weight colorless petroleum oil was sprayed on the granules at the rate of 5 pounds per ton of original uncoated granules to reduce dusting.

The resulting white threated granules were then employed in the preparation of bituminous roll roofing and asphalt shingles. They were applied as a layer or coating to the heated asphalt-impregnated and asphalt-coated fibrous base sheet material, and pressed into place by means of rolls. The asphalt contained 2½% by weight of N-chloro, octadecyl, dimethyl-2-methyl N'-chloro, trimethyl ethylene diamine in solution. Water was then sprayed over the sheet so as to rapidly cool and harden the asphalt preparatory to the cutting and packing of the finished roofing. The roofing thus prepared was subjected to adhesions tests in order to determine the resistance of the granule to removal from the asphalt base.

Test samples of the roofing sheet of the present example were cut to a rectangular size of 2" by 9" and subjected to tests for determining the sufficiency of adhesion between the granules and the asphalt base. In the test, a strip of the dry roofing was first weighed and then rigidly clamped into a flat position. A stiff wire brush having a rectangular bristle area of 1 5⁄16" by ⅞" was then brushed back and forth lengthwise over the granule surfacing, the length of the brush being transverse to the length of the sample. The force of the brush against the sample was 5 pounds. The length of the brush stroke was 6¼". Fifty brushing cycles, that is, fifty strokes in each direction, were completed in each test. The sample was then removed and again weighed. The test was repeated on approximately one dozen test samples taken from the same roofing and the average weight loss per sample was determined, which loss may be attributed substantially entirely to granules removed by the brushing. This first test on the dry samples is known as a "dry rub test."

The same test samples were then immersed in water for about two hours and the rub test was repeated, this being known as the "wet rub test." The results of this test are shown in Table I below.

Table 1.—Rub test

| Avg. Loss | Treated Asphalt | Control |
|---|---|---|
| Dry | .53 | .53 |
| Wet | 1.55 | 4.75 |

Samples similar to those used in the above "rub tests" were subjected to "pick tests." In accordance with this test, the cooled samples were picked dry after two hours, and after eighteen hours of soaking in water. The percent "pick," shown in Table II below, corresponds to the percent area of the roofing granule covered with asphalt that was actually embedded in the asphalt base.

Table II.—Pick test

| | Treated Asphalt, Percent | Control, Percent |
|---|---|---|
| Dry | 94 | 89 |
| 2-Hour Wet | 89 | 26 |
| 18-Hour Wet | 77 | 5 |

Stain tests were carried out as follows on samples as described above and the results shown in Table III. Shingle samples were placed in an infra-red radiant oven at 176° F. for a period of four days. Samples were then rated in a scale from 1 to 10, zero being perfect.

Table III.—Stain test

| Treated Asphalt, 4-Day Stain | Control |
|---|---|
| 2 | 8 |

The control tests shown in Tables I, II and III were performed on identically manufactured roofing (which itself has seen wide commercial use), with the exception that with the control sample, the treatment of the asphalt with the cationic amine was omitted.

Having described my invention, I claim:

1. A composite sheet body for roofing and siding comprising a plastic stratum containing dissolved therein a cationic quaternary hydrocarbon amine salt and a firmly adherent surfacing for the same comprising oil-stain resistant granules, said granules comprising a mineral granule having a coating formed from an anionic oleophobic fluorocarbon sizing agent.

2. A composite sheet body for roofing and siding comprising a bitumen stratum containing dissolved therein a cationic quaternary hydrocarbon polyamine salt having a hydrocarbon tail of 8 to 24 carbon atoms and a firmly adherent surfacing for the same comprising oil-stain resistant granules, said granules comprising a mineral granule having a coating formed from an anionic alkali metal salt of a fluorocarbon monobasic acid.

3. A composite sheet body for roofing and siding comprising an asphalt stratum containing dissolved therein between about 0.5 and about 10 weight percent of a cationic chlorine salt of quaternary hydrocarbon polyamine having a hydrocarbon tail of 8 to 24 carbon atoms and a firmly adherent surfacing for the same comprising oil-stain resistant granules, said granules comprising a mineral granule having between about 5 and 1000 parts per million of a coating formed from an anionic alkali metal salt of a fluorocarbon monobasic acid.

References Cited by the Examiner

UNITED STATES PATENTS

| | | | |
|---|---|---|---|
| 2,874,174 | 2/1959 | Huber et al. | 106—273 |
| 2,891,873 | 6/1959 | Falkenberg et al. | 106—273 |
| 2,906,635 | 9/1959 | Teot | 106—273 |
| 3,013,893 | 12/1961 | Olson et al. | 117—32 |
| 3,026,266 | 3/1962 | Mertens et al. | 252—311.5 |
| 3,050,468 | 8/1962 | Wright | 252—311.5 |

WILLIAM D. MARTIN, *Primary Examiner.*

S. W. ROTHSTEIN, *Assistant Examiner.*